US012515361B2

(12) United States Patent
Perez Lopez et al.

(10) Patent No.: US 12,515,361 B2
(45) Date of Patent: Jan. 6, 2026

(54) ELECTRIC SHAVER

(71) Applicant: Braun GmbH, Kronberg (DE)

(72) Inventors: Cirilo Javier Perez Lopez, Frankfurt am Main (DE); Andreas Erndt, Kelkheim (DE); Gerd Laschinski, Oberursel (DE); Wolfgang Stegmann, Frankfurt am Main (DE)

(73) Assignee: Braun GMBH, Kronberg (DE)

(*) Notice: Subject to any disclaimer, the term of this patent is extended or adjusted under 35 U.S.C. 154(b) by 371 days.

(21) Appl. No.: 15/714,945

(22) Filed: Sep. 25, 2017

(65) Prior Publication Data

US 2018/0085953 A1 Mar. 29, 2018

(30) Foreign Application Priority Data

Sep. 28, 2016 (EP) .................................... 16191117
Sep. 25, 2017 (EP) .................................... 17192804

(51) Int. Cl.

*B26B 19/38* (2006.01)
*A61C 17/22* (2006.01)
*B26B 19/04* (2006.01)
*B26B 19/06* (2006.01)
*B26B 19/20* (2006.01)
*B26B 19/26* (2006.01)

(Continued)

(52) U.S. Cl.

CPC .......... *B26B 19/388* (2013.01); *A61C 17/221* (2013.01); *B26B 19/042* (2013.01); *B26B 19/06* (2013.01); *B26B 19/20* (2013.01); *B26B 19/265* (2013.01); *B26B 19/38* (2013.01); *B26B 19/3806* (2013.01); *B26B 19/3813* (2013.01); *B26B 19/384* (2013.01); *B26B 19/386* (2013.01); *B26B 19/3873* (2013.01); *B26B 19/3886* (2013.01); *B26B 19/40* (2013.01); *B26B 19/48* (2013.01)

(58) Field of Classification Search

CPC ....... B26B 19/20; B26B 19/384; B26B 19/48; B26B 19/40; B26B 19/388; B26B 19/3886

See application file for complete search history.

(56) References Cited

U.S. PATENT DOCUMENTS 3,138,866 A 6/1964 Ressler
3,590,482 A 7/1971 Carr (Continued)

FOREIGN PATENT DOCUMENTS

CN 1174633 A 2/1998
CN 1209088 A 2/1999

(Continued)

OTHER PUBLICATIONS

European Search Opinion and Report; EP Application No. 16191117. 7; May 17, 2017; European Patent Office.

(Continued)

*Primary Examiner* — Adam J Eiseman
*Assistant Examiner* — Fernando A Ayala
(74) *Attorney, Agent, or Firm* — Gerd Zetterer

(57) ABSTRACT

An electric shaver provided with at least one cutter unit, a drive unit for driving the at least one cutter unit and a display device for displaying information, wherein the drive unit, when being active, is operable in different operation modes, wherein a mode input element is provided for switching the drive unit into different operation modes.

17 Claims, 6 Drawing Sheets

(51) Int. Cl.

| | |
|---|---|
| ***B26B 19/40*** | (2006.01) |
| ***B26B 19/48*** | (2006.01) |

(56) References Cited

U.S. PATENT DOCUMENTS

| | | | | |
|---|---|---|---|---|
| 3,748,732 | A | 7/1973 | Frantz et al. | |
| 3,781,990 | A | 1/1974 | Loner | |
| 4,285,041 | A * | 8/1981 | Smith | A63B 71/0686 235/105 |
| 5,240,107 | A * | 8/1993 | Casale | B26B 21/4087 206/349 |
| 5,317,134 | A * | 5/1994 | Edamura | H05B 6/6435 219/720 |
| 5,347,715 | A * | 9/1994 | Friedland | B26B 21/4056 30/41.7 |
| 5,801,637 | A | 9/1998 | Lomholt | |
| 5,894,670 | A | 4/1999 | Iso et al. | |
| 5,941,188 | A * | 8/1999 | Takashima | B63B 49/00 440/87 |
| 6,233,535 | B1 | 5/2001 | Petretty | |
| 6,313,612 | B1 | 11/2001 | Honda et al. | |
| 6,326,884 | B1 | 12/2001 | Wohlrabe | |
| 6,378,210 | B1 * | 4/2002 | Bickford | B26B 19/3806 30/122 |
| 6,513,532 | B2 * | 2/2003 | Mault | A61B 5/02055 600/595 |
| 6,611,780 | B2 | 8/2003 | Lundell et al. | |
| 6,757,182 | B2 | 6/2004 | Smidt et al. | |
| 6,820,597 | B1 * | 11/2004 | Cullen | F02M 25/0809 123/520 |
| 7,306,366 | B1 * | 12/2007 | Camenzind | B25F 1/00 30/155 |
| 7,385,719 | B2 * | 6/2008 | Ohno | H04N 21/4722 358/1.9 |
| 7,498,526 | B2 | 3/2009 | Lohr et al. | |
| 7,877,880 | B2 | 2/2011 | Royle | |
| 8,084,956 | B2 * | 12/2011 | Fukuda | H05B 41/2883 315/246 |
| 8,122,061 | B1 * | 2/2012 | Guinness | G06F 16/211 707/802 |
| 8,141,253 | B2 | 3/2012 | Royle | |
| 8,627,573 | B2 | 1/2014 | Kraus et al. | |
| 8,821,421 | B2 | 9/2014 | Imboden et al. | |
| 8,857,063 | B2 | 10/2014 | Koike | |
| 8,902,125 | B1 * | 12/2014 | Robbins | G09G 5/391 345/3.1 |
| 8,955,228 | B2 | 2/2015 | Eichhorn et al. | |
| 9,503,648 | B2 * | 11/2016 | Hirooka | H04N 5/2628 |
| 10,114,354 | B2 | 10/2018 | Simeth et al. | |
| 10,421,203 | B2 | 9/2019 | Perez Lopez et al. | |
| 2003/0115694 | A1 | 6/2003 | Pace | |
| 2005/0028371 | A1 | 2/2005 | Kakimoto | |
| 2005/0144784 | A1 | 7/2005 | Ibuki et al. | |
| 2005/0177139 | A1 | 8/2005 | Yamazaki et al. | |
| 2007/0261185 | A1 | 11/2007 | Guney et al. | |
| 2007/0283565 | A1 | 12/2007 | Ho | |
| 2008/0163495 | A1 | 7/2008 | Smal | |
| 2008/0196258 | A1 | 8/2008 | Kraus | |
| 2010/0191404 | A1 * | 7/2010 | Ishikawa | B60K 35/00 701/31.4 |
| 2011/0010876 | A1 | 1/2011 | Iwahori et al. | |
| 2011/0314677 | A1 * | 12/2011 | Meier | A46B 5/0062 30/41.8 |
| 2012/0192436 | A1 | 8/2012 | Toy | |
| 2013/0125326 | A1 * | 5/2013 | Schmid | A46B 9/04 15/105 |
| 2014/0081521 | A1 * | 3/2014 | Frojdh | G01C 21/3664 701/36 |
| 2014/0284070 | A1 * | 9/2014 | Ng | B25F 5/00 173/2 |
| 2015/0116337 | A1 * | 4/2015 | Chueh | G06F 1/3265 345/522 |
| 2015/0205279 | A1 * | 7/2015 | Simeth | B26B 19/388 206/349 |
| 2015/0216294 | A1 * | 8/2015 | Mongan | A46B 17/065 15/105 |
| 2015/0246454 | A1 * | 9/2015 | Mintz | B26B 19/3853 30/124 |
| 2015/0333982 | A1 * | 11/2015 | Kang | G06F 15/0225 709/224 |
| 2016/0018942 | A1 * | 1/2016 | Kang | G06F 3/0416 345/173 |
| 2016/0105613 | A1 * | 4/2016 | Takanashi | H04N 23/673 348/333.02 |
| 2016/0110907 | A1 * | 4/2016 | Kelly | A63F 13/25 345/473 |
| 2016/0167241 | A1 * | 6/2016 | Goldfarb | B26B 21/4056 382/108 |
| 2016/0228184 | A1 * | 8/2016 | Yang | A61H 7/005 |
| 2016/0307712 | A1 | 10/2016 | Nishimura et al. | |
| 2017/0004703 | A1 * | 1/2017 | Schiebahn | A61C 17/221 |
| 2017/0053616 | A1 * | 2/2017 | Mueller | B60K 35/00 |
| 2017/0113360 | A1 * | 4/2017 | Godlieb | B26B 19/3853 |
| 2017/0140482 | A1 * | 5/2017 | Salter | G08C 19/16 |
| 2017/0232624 | A1 * | 8/2017 | King | G01K 1/14 30/34.05 |
| 2017/0258217 | A1 * | 9/2017 | Zachar | A46B 15/0008 |
| 2017/0318954 | A1 * | 11/2017 | Nishiura | A46B 15/0008 |
| 2017/0371429 | A1 * | 12/2017 | Tsai | G06F 3/0488 |
| 2018/0085942 | A1 | 3/2018 | Perez Lopez et al. | |
| 2018/0085943 | A1 | 3/2018 | Bady et al. | |
| 2018/0085952 | A1 | 3/2018 | Perez Lopez et al. | |
| 2018/0085953 | A1 | 3/2018 | Perez Lopez et al. | |
| 2018/0129275 | A1 * | 5/2018 | Isomura | G04C 3/002 |
| 2018/0164749 | A1 * | 6/2018 | Yuen | G04G 9/0047 |
| 2018/0317821 | A1 * | 11/2018 | Arko | A61B 5/14532 |
| 2019/0061183 | A1 | 2/2019 | Neyer | |
| 2021/0096722 | A1 * | 4/2021 | Hashimoto | G06F 1/16 |

FOREIGN PATENT DOCUMENTS

| | | | | |
|---|---|---|---|---|
| CN | 2497943 | Y | 7/2002 | |
| CN | 1628014 | A | 6/2005 | |
| CN | 2834822 | Y | 11/2006 | |
| CN | 101005930 | A | 7/2007 | |
| CN | 201192853 | Y | 2/2009 | |
| CN | 101969879 | A | 2/2011 | |
| CN | 102405028 | A | 4/2012 | |
| CN | 203293228 | U | 11/2013 | |
| CN | 103600362 | A | 2/2014 | |
| CN | 104209965 | A | 12/2014 | |
| CN | 204450602 | U | 7/2015 | |
| CN | 204976697 | U | 1/2016 | |
| CN | 105313149 | A | 2/2016 | |
| CN | 105437267 | A | 3/2016 | |
| CN | 109789588 | A | 5/2019 | |
| CN | 109789589 | A | 5/2019 | |
| CN | 109789590 | A | 5/2019 | |
| CN | 120295444 | A * | 7/2025 | H02J 3/48 |
| DE | 19817273 | A1 | 10/1999 | |
| DE | 102005003058 | A1 | 7/2006 | |
| EP | 1504859 | A1 | 9/2005 | |
| EP | 2218559 | B1 | 8/2012 | |
| EP | 2500153 | A2 | 9/2012 | |
| EP | 3300864 | A1 | 4/2018 | |
| EP | 3300865 | A1 | 4/2018 | |
| EP | 3300866 | A1 | 4/2018 | |
| GB | 1021836 | | 3/1966 | |
| JP | 61134785 | A | 6/1986 | |
| JP | H03224590 | A | 10/1991 | |
| JP | H11501200 | A | 1/1999 | |
| JP | 2002028383 | A | 1/2002 | |
| JP | 2002306867 | A | 10/2002 | |
| JP | 2002320399 | A | 10/2002 | |
| JP | 2006141901 | A | 6/2006 | |
| JP | 2007101509 | A | 4/2007 | |
| JP | 2012523298 | A | 10/2012 | |
| JP | 2019533493 | A | 11/2019 | |
| JP | 2019533494 | A | 11/2019 | |
| JP | 2019535342 | A | 12/2019 | |
| JP | 2024029499 | A * | 3/2024 | H02J 3/48 |
| WO | WO 98/25736 | | 6/1998 | |

(56) References Cited

FOREIGN PATENT DOCUMENTS

| | | | |
|---|---|---|---|
| WO | WO 2009/027928 | | 3/2009 |
| WO | 2016005142 | A1 | 1/2016 |
| WO | WO 2016/041929 | | 3/2016 |
| WO | 2018060844 | A2 | 4/2018 |
| WO | 2018060845 | A1 | 4/2018 |
| WO | 2018060846 | A1 | 4/2018 |

OTHER PUBLICATIONS

International Preliminary Report on Patentability; International Application No. PCT/IB2017/055839; Apr. 2, 2019; European Patent Office; Munich, Germany.
International Search Report and Written Opinion of the International Searching Authority; International Application No. PCT/IB2017/055839; Apr. 5, 2018; European Patent Office; Munich, Germany.
International Preliminary Report on Patentability; International Application No. PCT/IB2017/055840; Apr. 2, 2019; European Patent Office; Munich, Germany.
International Search Report and Written Opinion of the International Searching Authority; International Application No. PCT/IB2017/055840; Apr. 5, 2018; European Patent Office; Munich, Germany.
International Preliminary Report on Patentability; International Application No. PCT/IB2017/055841; Apr. 2, 2019; European Patent Office; Munich, Germany.
International Search Report and Written Opinion of the International Searching Authority; International Application No. PCT/IB2017/055841; Apr. 5, 2018; European Patent Office; Munich, Germany.
European Search Opinion and Report; EP Application No. 17192804.7; Feb. 13, 2018; European Patent Office.
European Search Opinion and Report; EP Application No. 17192805.4; Feb. 13, 2018; European Patent Office.
European Search Opinion and Report; EP Application No. 17192804.7; May 31, 2019; European Patent Office.
Notice of Intent to Grant; EP Application No. 17192805.4; Jun. 28, 2019; European Patent Office.
First Office Action; Chinese Application No. 201780059908.1; May 19, 2020; The State Intellectual Property Office of People's Republic of China.
First Office Action; Chinese Application No. 201780059921.7; Mar. 31, 2020; The State Intellectual Property Office of People's Republic of China.
First Office Action; Chinese Application No. 201780059946.7; May 19, 2020; The State Intellectual Property Office of People's Republic of China.
Yamamura, Kazuhito; Japanese Notice of Reason for Refusal; Japanese Patent Application No. 2019-516506; Feb. 18, 2020; Japanese Patent Office.
Yamamura, Kazuhito; Japanese Notice of Reason for Refusal; Japanese Patent Application No. 2019-516128; Feb. 4, 2020; Japanese Patent Office.
Yamamura, Kazuhito; Japanese Notice of Reason for Refusal; Japanese Patent Application No. 2019-514757; Dec. 24, 2019; Japanese Patent Office.
Michalski, Sean M.; Final Office Action; U.S. Appl. No. 15/714,835; Dec. 11, 2019; United States Patent and Trademark Office; Alexandria, Virginia.
Payer, Hwei-Siu C.; Notice of Allowance; U.S. Appl. No. 15/714,971; May 28, 2019; U.S. Patent and Trademark Office; Alexandria, Virginia.
Michalski, Sean M.; Office Action; U.S. Appl. No. 15/714,835; May 9, 2019; United States Patent and Trademark Office; Alexandria, Virginia.
Payer, Hwei-Siu C.; Office Action; U.S. Appl. No. 15/714,971; Jan. 25, 2019; United States Patent and Trademark Office; Alexandria, Virginia.
European Partial Search Report; EP Application No. 16191117.7; Mar. 24, 2017; European Patent Office.
European Priority Search Report; EP Application No. 16191117.7; May 17, 2017; European Patent Office.
First Search; Chinese Application No. 201780059921.7; Mar. 25, 2020; The State Intellectual Property Office of People's Republic of China; Beijing, China.
First Search; Chinese Application No. 201780059946.7; May 10, 2020; The State Intellectual Property Office of People's Republic of China; Beijing, China.
First Search; Chinese Application No. 201780059908.1; May 12, 2020; The State Intellectual Property Office of People's Republic of China; Beijing, China.

* cited by examiner

ELECTRIC SHAVER

FIELD OF THE INVENTION

The present invention relates to an electric shaver comprising at least one cutter unit, a drive unit for driving said at least one cutter unit and a display device for displaying information. The present invention also relates to a method for controlling such electric shaver. The present invention further relates to a multipurpose personal care appliance to which different types of tooling elements such as a long-hair cutter, a short-hair cutter and a skincare unit can be attached.

BACKGROUND OF THE INVENTION

Electric shavers usually have one or more cutter elements driven by an electric drive unit in an oscillating manner where the cutter elements reciprocate under a shearfoil, wherein such cutter elements or undercutters may have an elongated shape and may reciprocate along their longitudinal axis. Other types of electric shavers use rotatory cutter elements which may be driven in an oscillating or a continuous manner. Said electric drive unit may include an electric motor or an electric-type linear motor, wherein the drive unit may include a drive train having elements such as an elongated drive transmitter for transmitting the driving motion of the motor to the cutter element, wherein the motor may be received within the handle portion of the shaver or in the alternative, in the shaver head thereof.

Such drive units are sometimes operable in different operation modes, wherein for example the cutter speed or oscillation frequency may be varied to increase shaving efficiency in a fast mode or highspeed mode, whereas power consumption may be reduced in a slow mode or low speed mode. Depending on the fittings of the shaver, other operation modes may be offered and may include a long-hair cutting mode in which the drive unit, in addition to or in the alternative to driving the at least one cutter unit, may drive a long hair cutter, or a fluid application mode in which a lubricating applicator such as a spray nozzle may be activated, or a ventilating mode in which a ventilator may be driven by the drive unit to generate airflow to achieve cooling or cleaning.

So as to give a user the option to choose between those different operation modes, the shaver may be provided with a mode input element such as a touch button, a toggle switch or a gesture sensor to allow the user to input a respective mode command switching the shaver's drive unit and/or a control unit into the desired operation mode. For example, document US 2015/0246454 A shows an electric shaver operable in more than one operating mode, wherein a mode input element is provided for switching the driving unit into different operation modes. Sometimes switching between different operation modes may be effected automatically, for example the aforementioned low speed mode may be chosen automatically when the battery charging level becomes low.

In order to give the user feedback which operation mode has been selected, such shavers may have a display device for displaying information about such operation mode. For example, the selected cutter speed may be indicated, or the activation of functional accessories such as the aforementioned fluid applicator or airflow generator may be displayed.

In addition or in the alternative to displaying such information on the operation mode, other information may be displayed by such display devices. For example, the charging status of a battery or accumulator of the shaver may be indicated, or the shaving time may be displayed, wherein such additional information also may be displayed when the shaver or the drive unit thereof is inactive. For example, it has been suggested to extend the activity of the display to a period of some seconds after switching off the shaver so that, for example, the battery charge level is indicated for some seconds after switching off the shaver and thereafter, fading out to the idle mode in which no information is displayed. Document WO 98/25736 A suggests to display certain shaver information on the shaver's charging/cleaning station which is provided with a display for displaying such data and communicates with the shaver for receiving user data from the shaver. It also has been suggested that the sleeping display can be waked up when the power button of the shaver is briefly touched.

Sometimes such shavers may be provided with additional personal care tools such as a skin treatment unit or a long-hair cutter unit or a beard trimmer. Such skin treatment units may comprise, for example, tooling elements such as a peeling tool, a massage brush or vibration elements for enhancing blood circulation. Such skincare tools can be fixedly or releasably attached to the head portion of the device. For example, document WO 2009/027928 A discloses a personal care appliance having a head provided with coupling means for coupling different types of tools with the drive transmitter, such tools including a vibrating safety razor, a hair trimming device and a comb attachment.

SUMMARY OF THE INVENTION

It is an objective underlying the present invention to provide for an improved electric shaver avoiding at least one of the disadvantages of the prior art and/or further developing the existing solutions. A more particular objective underlying the invention is to provide for an improved displaying of information to the user.

A further objective underlying the invention is to provide for an improved control of information to be displayed to the user without sacrificing easy handling of the shaver. More particularly, a self-explaining, intuitive handling and use of the information functions of the shaver should be achieved.

A still further objective underlying the invention is to provide for an improved multipurpose personal care appliance offering improved operation of various tool elements such as a short-hair cutter, a long-hair cutter or a skin treatment unit.

To achieve at least one of the aforementioned objectives, the shaver's display device may be provided with an automatic switching mode in which different sets of information are displayed automatically one after the other under control of a timer. Such automatic switching mode keeps the user informed of any relevant information and, in addition, makes the user learn to know the shaver's different information functions and different sets of information.

Such automatic switching mode of the display device may be activated in response to presence of a parameter indicative of the user being attentive and receptive and/or in response to a parameter indicative of a certain operational phase or status of the electric shaver. In particular, said automatic switching mode may be activated when the electric shaver is switched off and/or the drive unit becomes inactive. In the alternative or in addition, the automatic switching mode of the display device may be activated when the sleeping shaver is touched or an object such as a finger or a hand is approaching the sleeping shaver.

According to a further aspect, it is suggested to give the user the option to perceive different sets of information even when the shaver is switched off and/or the shaver's drive unit is inactive. More particularly, the electric shaver is configured to allow the user to select a specific one of a plurality of different sets of information. According to a first aspect, different functions are assigned to the electric shaver's mode input element in dependency of the electric shaver being switched on or switched off. When the electric shaver is switched on and/or the shaver's drive unit is active, said mode input element is configured to switch the driving unit into different operation modes, whereas, when the electric shaver is switched off and/or the shaver's drive unit is inactive, said mode input element is configured to switch the display device into different display modes for displaying different sets of information. Such double function of the mode input element allows for a natural, intuitive handling of the shaver as a user knowing the input element may be used to change the drive unit's operation modes when the shaver is switched on, naturally will use such mode input element to change the display modes of the display device when the shaver is inactive or switched off. In addition, due to such double function of the mode input element no additional button or key is necessary to switch the display modes and thus, space can be saved and an easy structure of the shaver's input element can be maintained.

These and other advantages become more apparent from the following description giving reference to the drawings and possible examples.

DETAILED DESCRIPTION OF THE INVENTION

Figure 1:
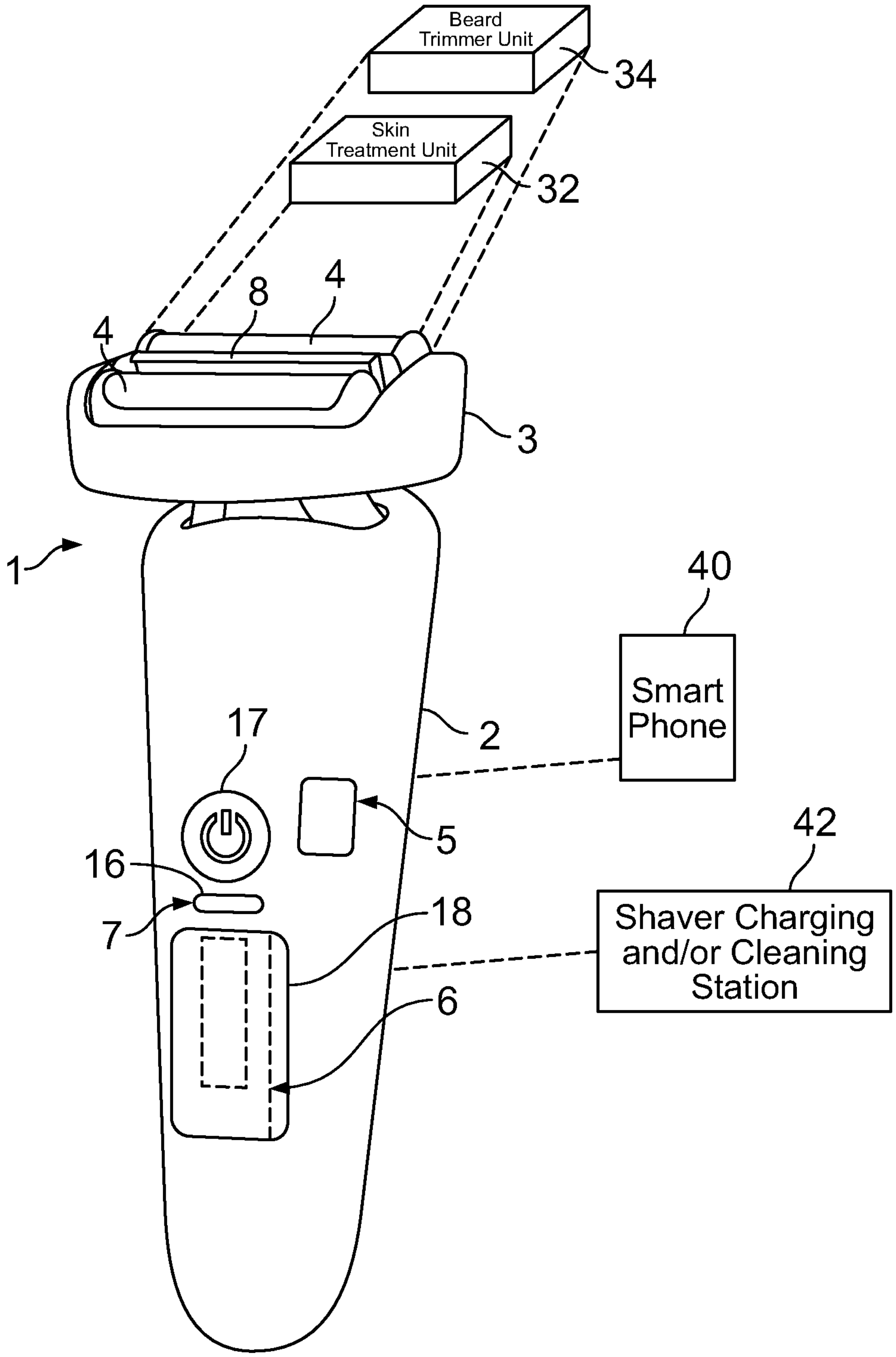
FIG. 1: a perspective view of an electric shaver comprising a handle and a shaver head connected thereto, wherein a display device of the shaver includes a display on the handle.

The electric shaver offers comfortable ways of communicating relevant information to the user, wherein according to one aspect the user actively may select the relevant information from a plurality of sets of information offered to be displayed. According to another aspect, the shaver may automatically display different sets of information to the user at a convenient point of time once a user is attentive and ready to perceive such information.

More particularly, according to a first aspect, the mode input element which is configured to switch the active shaver into different operation modes, is also configured to switch the display device into different display modes for displaying different sets of information when the drive unit is inactive and/or the shaver is sleeping. Thus, the mode input element is given a second function in addition to its genuine function of controlling the operation mode of the active shaver.

When the shaver is active and/or the drive unit is switched on, the mode input element may control the drive unit to operate either in a lower speed mode in which the cutter unit is driven at a lower speed and/or at a lower oscillation frequency, or in a highspeed mode in which the cutter unit is driven at a higher speed and/or at a higher oscillation frequency. Intermediate speed modes providing for cutter speeds and/or cutter oscillation frequencies between the aforementioned high speeds and low speeds also may be provided and switched on by the mode input element.

In addition to such speed control function, the input mode element also may be configured to control other grooming functions of the shaver. For example, the mode input element may activate a long-hair cutter to be driven by the drive unit. In addition or in the alternative to such long-hair cutting mode, the mode input element also may switch the shaver to operate in a short-hair shaving mode in which only the aforementioned at least one cutting unit is operated, wherein the long-hair cutter is switched into its inactive state. Other grooming functions such as applying lubricating and/or cooling fluid onto the skin, or blowing cooling/cleaning air onto the skin and/or onto the shaver head may be available, wherein the mode input element may be configured to activate the applicator providing for such function such as a fluid applicator and/or an airflow generator.

In addition to such control of the operation modes, the mode input element may be configured to switch the display device of the shaver into different display modes to display different sets of information. In particular, so as to be able to offer different sets of information, the shaver may be provided with a plurality of detectors for detecting respective information and/or parameters indicative of such information. For example, the display device may be connected to a charging level detector for detecting the charging level of an accumulator or battery of the shaver. A corresponding charge level signal provided by the charging level detector may be stored in a memory to which the display device has access and/or may be provided online to the display device. When the mode input element is used to switch to a charging level display mode, the mode input element may interact with the display device and/or a display controller thereof and/or said memory so as to make the display device to display the information on the charging level on the basis of the charging level signal of the detector.

In addition to or in the alternative, a shaving time and/or shaving run detector may be provided for detecting the shaving time and/or the number of shaving runs performed since a last cleaning run. The shaving time signal and/or shaving run signal provided by the detector may be stored in a memory to which the display device has access and/or may be provided directly to the display device, wherein the mode input element may be configured to switch the display device into a shaving time and/or shaving run display mode in which the display device and/or a display controller thereof effects displaying of a shaving time information and/or shaving run information on a display.

In addition or in the alternative, a cleaning status detector may detect the cleaning status of the shaver, wherein such detector may detect, for example, the time expired since a last cleaning cycle and/or the amount of hair dust residing in the shaver head and/or any other parameter indicative of the cleaning status. Again, such cleaning signal provided by the cleaning detector may be stored in a memory to which the display device has access and/or may be provided directly to the display device and/or a display controller thereof when the mode input element switches the display device into a cleaning status display mode so that the corresponding cleaning information is displayed.

In addition to or in the alternative, there may be also a wear detector for detecting wear and tear of the cutter unit, wherein such wear detector may detect the number of shaving runs since the last replacement of the cutter unit and/or the frictional resistance of the cutter unit when oscillating, i.e. the oscillation resistance and/or driving power necessary to drive the cutter unit, and/or any other parameter indicative of wear and tear of the cutter unit. The wear signal of such wear detector may be stored in a memory and/or directly provided to the display device when the display device and/or a display controller thereof is caused by the input mode element to display a wear information on the basis of such wear signal.

Said mode input element may include a touch key or touch button which may be realized as a mechanical button or as a soft key in terms of, for example, a touch screen button so that the mode input element may be activated by pressing or touching the touchkey. Such touchkey or touch button may be configured to provide for a switch forward and switch backward function so that it is possible to switch from a first mode to a second mode and from a second mode to a first mode. For example, the touch key may be configured to differentiate between one click and two clicks as it is known from a computer mouse. Touching the key only once may, for example, provide for the aforementioned forward switching, whereas touching the key twice within a predetermined time may provide for the backward switching.

In addition or in the alternative to such touchkey, the mode input element may include a gesture detector for detecting a finger gesture such as a finger wiping so as to allow for browsing through the various display modes by finger gestures. Such gesture detector also may be configured to provide for a forward switching and backward switching, wherein, for example, the direction of the finger wiping may be used to differentiate between backward and forward switching, wherein for example finger movements from left to right may be associated with forward switching whereas movements from the right to the left may provide for backward switching.

According to a further aspect, the mode input element may include a toggle switch button for toggling from one operation to another operation mode of the drive unit and toggling from one display mode to another display mode of the display device. If there are three or more operation modes or three or more display modes, toggling can be effected in a sort of circular fashion so that activating the toggle switch button a plurality of times effects switching from mode one to mode two to mode three to mode n and, when the last mode n is reached, further activation of the toggle switch button may cause switching from mode n to mode one again. In addition or in the alternative, such toggle switch button may be configured to provide for forward switching and backward switching as explained before.

According to a still further aspect, the mode input element may include a signal receiver and/or may be configured to be responsive to a received signal so as to switch the display modes and/or the motor operation modes and/or other functional operation modes in response to a received signal. Such mode switching signal may come from various electronic circuits and/or devices. In particular, the mode switch element may be responsive to a signal coming from an external device such as the shaver charging and/or cleaning station 42 or an electronic communication device such as a smartphone 40, a tablet or a laptop, thus allowing control of the display modes and/or motor operation modes and/or other functional operation modes by means of an external device.

The mode switch element also may receive a signal from a configuration detector detecting the configuration of the shaver and/or skincare device, wherein such configuration detector may detect, for example, the position and/or connection of a long-hair cutter, a beard trimmer unit 34 and/or a skin treatment unit 32 such as a brush or peeling device. If for example, a peeling device is attached to the shaver head and/or moved into an active position, the mode switch element may switch the motor into a corresponding skin treatment mode to drive such skin treatment unit appropriately and/or may switch the display into a skin treatment display mode indicating relevant information about skin treatment.

The aforementioned mode input element may include a software module and/or a hardware module responsive to and/or processing such mode input signals and/or mode switching signals. More particularly, a micro controller may be provided for receiving the aforementioned signals and controlling the drive unit's motor and/or the display device in such different modes in response to the received signals, wherein such micro controller may include the aforementioned software and/or hardware elements.

The function associated with the mode input element may be determined in different ways or on the basis of different parameters. For example, the activation status of the drive unit, for example power consumption of the motor of the drive unit may be used as parameter on the basis of which the function of the mode input element may be determined. For example, a detector may detect when the drive unit is active and working, wherein on the basis of a corresponding signal from such detector, the mode input element may be configured to switch the aforementioned operation modes of the shaver. On the other hand, when the detector does not provide such signal or provides for an inactive signal indicating the drive unit is not working and/or the shaver has been switched off, the mode button may be configured to switch the display modes. Thus, the mode input element may be responsive to a detector signal indicative of the shaver being active or sleeping and/or indicative of the drive unit being switched on or switched off.

In addition to or in the alternative to the mode input element being responsive to the working/sleeping status of the drive unit or the shaver, a shifting element can be provided for shifting the function of the mode input element from being configured to switch the operating modes to being configured to switch the displaying modes. Such shifting element gives the user the option to actively change the functions of the mode input element irrespective of the working/sleeping status of the shaver and could include, for example, a touch key or touch button. It also would be possible that the shifting element and/or shifting function is integrated into the mode input element in terms of, for example, a detector for detecting activation time of the mode input element. For example, a brief, normal touching or clicking of the mode input element can be interpreted as a command for switching the operation mode or the display mode depending on the working/sleeping status of the shaver, whereas on the other hand, a longer touching of the mode input element exceeding a predetermined period of time, for example three seconds, could be interpreted as a command for shifting the function of the mode input element. For example, when the shaver is active and the drive unit works, pressing the mode input element for more than three seconds could be interpreted as a command for shifting into the display mode function allowing to shift the display modes of the display device.

According to a further aspect of the invention, the display device is configured to be operable in an automatic switching mode in which different sets of information are displayed one after the other under control of a timer so that each of the available sets of information or each of a predetermined subgroup of the available sets of information is displayed for a predetermined period of time one after the other on a display.

Such automatic switching mode of the display device can be activated in different ways and may form an aspect of a shaver which does not have and does not need the aforementioned mode input element, but nevertheless may have such mode input element. According to a further aspect, activation is effected at a point of time where the user is attentive and, under normal circumstances, may perceive the automatically displayed information. For example, an activator may activate the automatic switching mode in response to a switching off signal indicating switching off the drive unit and/or indicating transition of the drive unit from being active to being inactive, and/or in response to a switch on signal indicating switching on the drive unit and/or indicating transition of the drive unit from being inactive to being active.

In the alternative or in addition, said automatic switching mode may be activated one an object such as a finger or a hand touches the sleeping shaver and/or approaches the sleeping shaver. To detect such approach, the shaver, in particular the shaver handle may be provided with a detector or sensor device capable of detecting an object such as a finger or a hand approaching the shaver. Such detector may include a touch sensor and/or an opticle sensor or any other sensor capable of detecting a finger in its neighborhood.

The display device may include a display on the shaver handle, wherein such display may include, for example, an LED display device or other suitable display types.

In order to achieve a space-saving display arrangement, the display device may include at least one display field which is used for displaying information relative to the operation modes as well as information relative to other aspects of the shaver such as the aforementioned charging level, shaving time, cleaning status or wear and tear status. For example, such display field may be configured to display pictograms such as a cascade or row of display points or LEDs.

In addition or in the alternative to a display provided on the electric shaver itself, a display may be provided on a cleaning and/or loading station configured to receive and/or be connected to the electric shaver so as to charge the shaver's battery and/or clean the shaver, wherein a fluid may be applied to the shaver head to clean the shaver. Such cleaning and/or charging station may include a display device configured to communicate with the electric shaver at least when the shaver is docked into the station so as to display the aforementioned information. The display at the cleaning and/or charging station may be controlled by means of the shaver's mode input element and/or in the aforementioned automatic switching mode automatically switching from one display mode to another display mode.

The display device of the cleaning and/or charging station may be controlled from the shaver and/or by means of input elements at the station itself. To allow for control of the station's display from the shaver, the shaver and the station may be provided with data communication interfaces which may include physical connection elements that can be brought into contact with each other when the shaver is docked into the station, and/or wireless communication elements such as bluetooth or other nearfield communication interfaces.

According to a further aspect, the electric shaver may provide for automatic indication of the shaver head's dirt status. Cut hair or other debris such as dust or dirt is usually accumulated within the interior space of the shaver head below the shaver head's cutter unit. From time to time, such interior space of the shaver head needs to be cleaned. To remind the user of cleaning when it is necessary or to automatically control and/or initiate such cleaning, the shaver may be provided with a dirt measurement unit measuring at least one parameter that is related to the dirt status and/or the amount of dirt accumulated in the shaver head.

For example, said measurement unit may measure relevant parameters such as shaving time and/or shaving resistance and/or frictional resistance of a cutter element and/or power consumption of the drive unit during shaving and/or contact pressure (as users tend to increase contact pressure when shaving performance decreases) and/or electrical signals of sensor elements such as electric resistance sensors responsive to hair/dust coating or optical sensors, or other parameters indicative of debris in the shaver head.

A micro controller may analyze such measured parameters to determine the dirt status of the shaver head and may cause an indicating means to give a user an indication signal or information about the dirt status which may be, for example, displayed on the aforementioned display device. In addition or in the alternative, the micro controller may provide a signal to the cleaning station to automatically initiate a cleaning cycle in response to the determined dirt status and/or a signal to a smart phone to display the dirt status there.

These and other features become more apparent from the example showing in the drawings. As can be seen from FIG. 1, the shaver 1 may have a shaver housing forming a handle 2 for holding the shaver, which handle may have different shapes such as—roughly speaking—a substantially cylindrical shape or box shape or bone shape allowing for economically grabbing the shaver.

On one end of the shaver 2, a shaver head 3 is attached to the handle, wherein the shaver head 3 may be slewably supported about one or more slewing axes.

The shaver head 3 includes at least one cutter unit 4 which may include a cutter element or undercutter reciprocating under a shearfoil. The shaver head 3 may also include a long hair cutter 8 as it is shown by FIG. 1.

So as to drive such cutter unit 4 and the long hair cutter 8, a drive unit 5 may include a motor that can be received within the handle 2 and can be connected to the cutter unit 4 and the long hair cutter 8 by means of a transmitter or drive train extending from the motor to the cutter unit.

As can be seen from FIG. 1, an ON-OFF switch or power switch 17 may be arranged at the handle 2, for example on a front side of said handle 2. By means of such power switch 17, the drive unit 5 may be started and switched off again.

As can be seen from FIGS. 2 to 6, the shaver 1 further includes a display 18 which may be provided on the handle 2, for example on a front side thereof. Such display 18 may be part of a display device 6 further including additional electronic components or other elements such as a display controller 11, a memory, power supply components etcetera.

The display 18 may include a first display field 18*a* comprising an LED cascade and a second or further display field 18*b* where symbols and/or pictograms indicative of the type of information to be displayed can be shown and displayed, cf. FIGS. 3A and 3B and 4A and 4B.

As can be seen from FIG. 5, the shaver 1 may further include a mode input element 7 in terms of, for example, a touch button 16 which may be positioned in the neighborhood of the power switch 17.

As illustrated by the figures, the display device 6 may work in an automatic mode and in addition, in a manually controlled mode. For example, when starting the shaver 1 by touching the power switch 17, the display 18 may show a cascade of light signals so as to indicate that the shaver is wakening up. For example, after starting with only one light blinking or lighting, the number of the lighting LEDs may be increased one by one until all LED of the cascade are lightening.

Figure 2B:
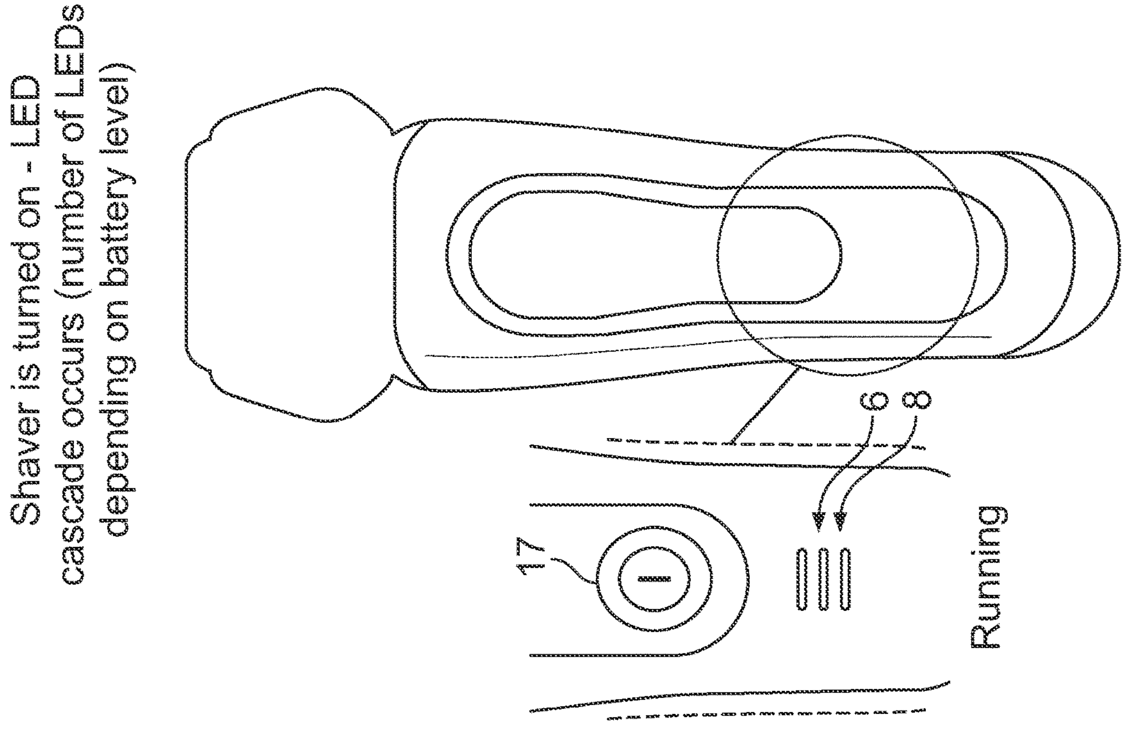
FIGS. 2A and 2B: schematic views of the shaver's display in different display modes, illustrating the display's transition when the shaver is turned on, FIGS. 3A and 3B: schematic views of the shaver's display in further different display modes to further illustrate the display devices automatic switching mode, wherein a transition of the display is shown when the shaver's drive unit is switched off.
Figure 2A:
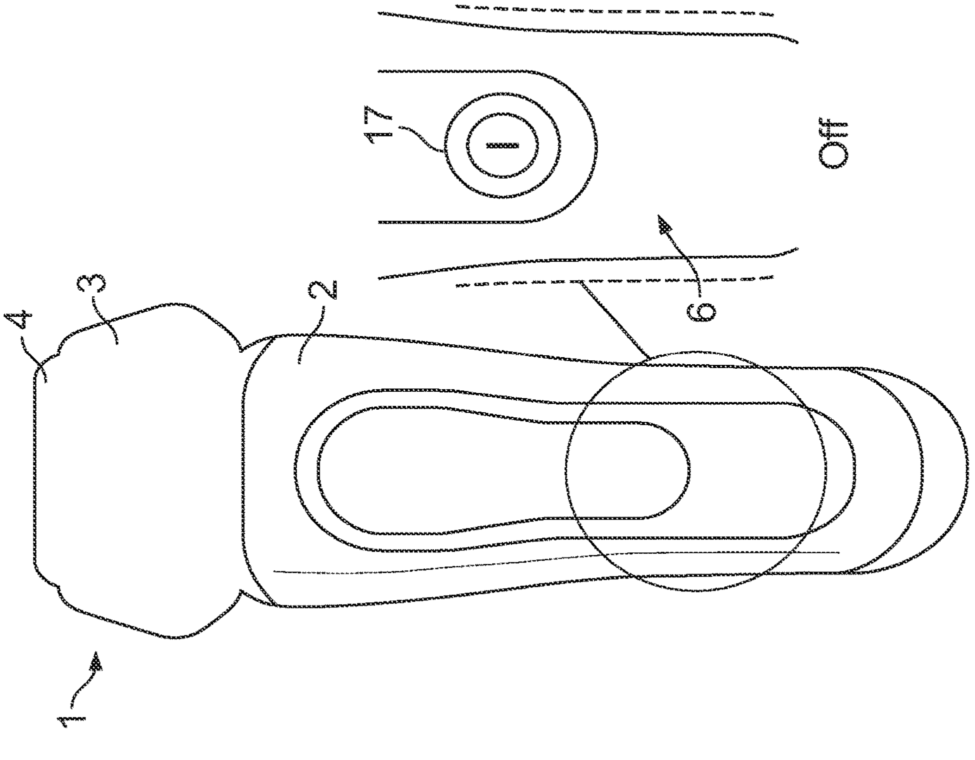

After such initialization procedure or in the alternative thereto, the display 18 may display the battery level, wherein the number of the cascade bars lightening may correspond to the battery level, cf. FIGS. 2A and 2B.

Figures 3A, 3B:
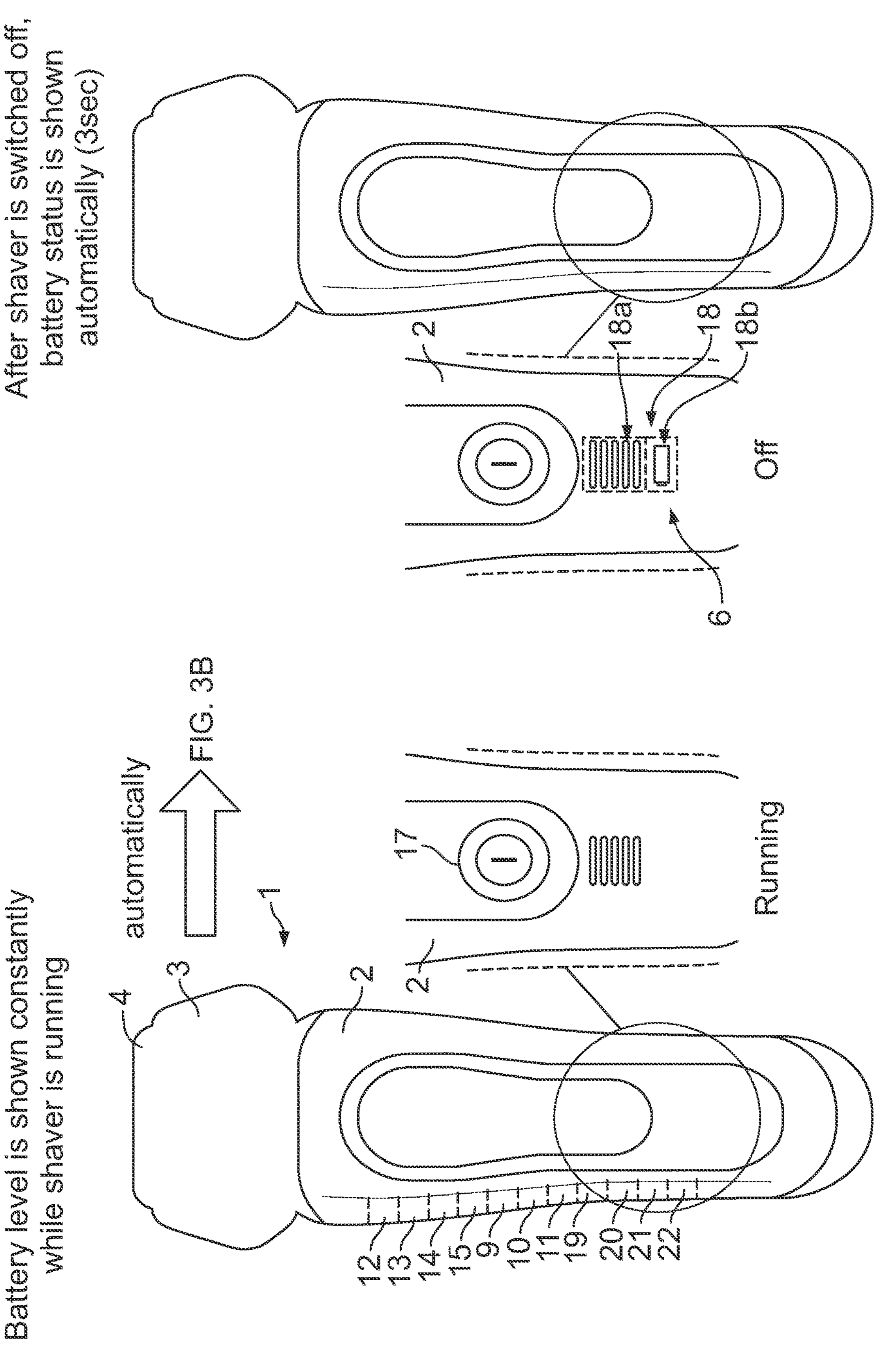

As can be seen from FIGS. 3A and 3B, the display 18 may continue to display the battery level for a predetermined period of time after the shaver has been switched off. For example, the battery status may be shown automatically for three seconds, cf. FIG. 3B.

According to an aspect, the display 18, after switching off the shaver, does not only show the charging level, but automatically switches into other display modes to display other sets of information. Such automatic switching mode of the display device 6 may have been activated by an activator 10 in response to a parameter indicating switching off the shaver. Such activator may be responsive to a detector signal or a parameter indicative of switching off the shaver.

In addition or in the alternative, the automatic switching mode of the display device 6 also may be activated by said activator 10 in response to a parameter indicating approximation of an object or subject to the shaver 1, in particular a finger or a hand portion approaching or touching the shaver 1. Thus, the activator 10 may be configured to responsive, when the shaver is sleeping, to a detector signal of an approximation detector or contact sensor 19.

Figure 4B:
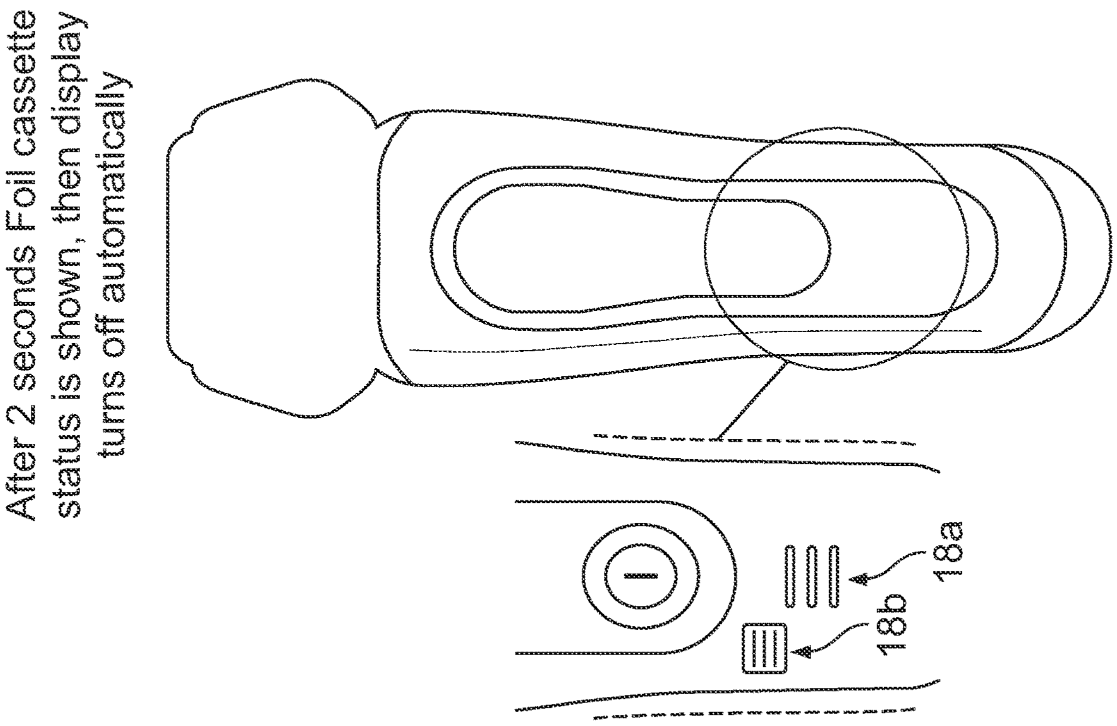
FIGS. 4A and 4B: schematic views of the shaver's display in still further display modes to further illustrate the automatic switching mode of the display device, wherein a transition between two further display modes is shown after having switched off the shaver's drive unit.
Figure 4A:
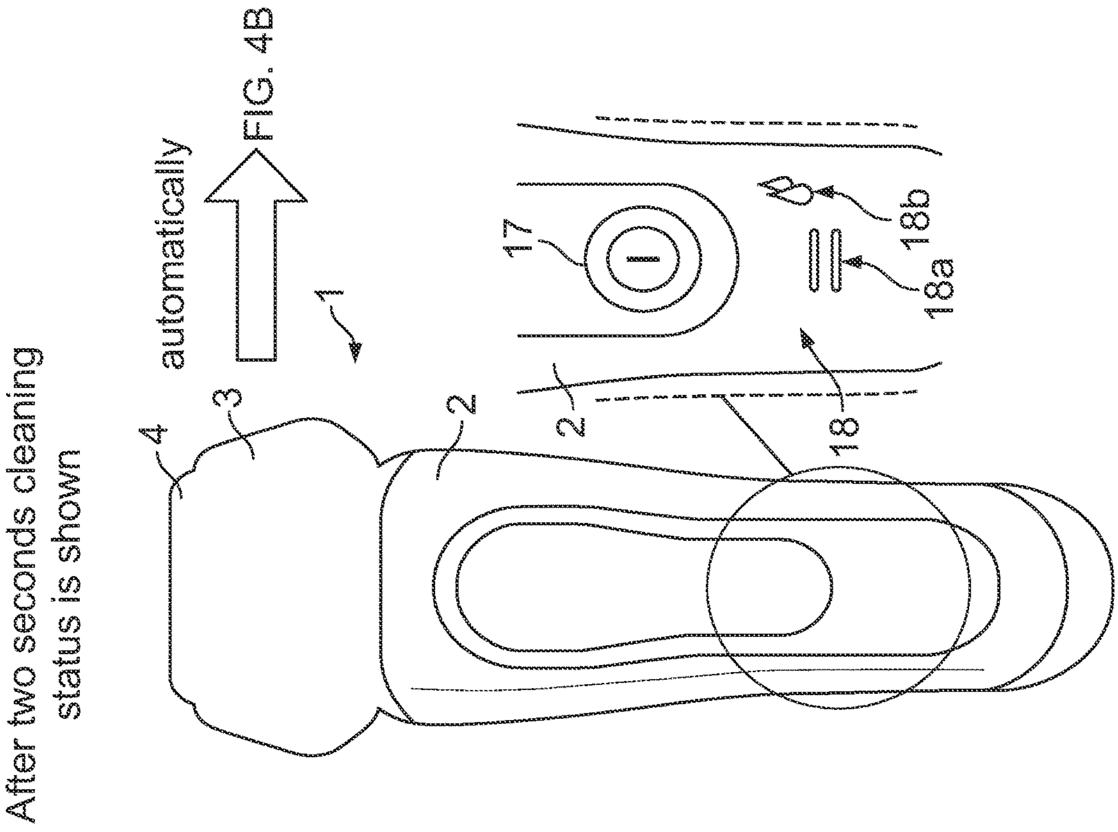
Figure 5B:
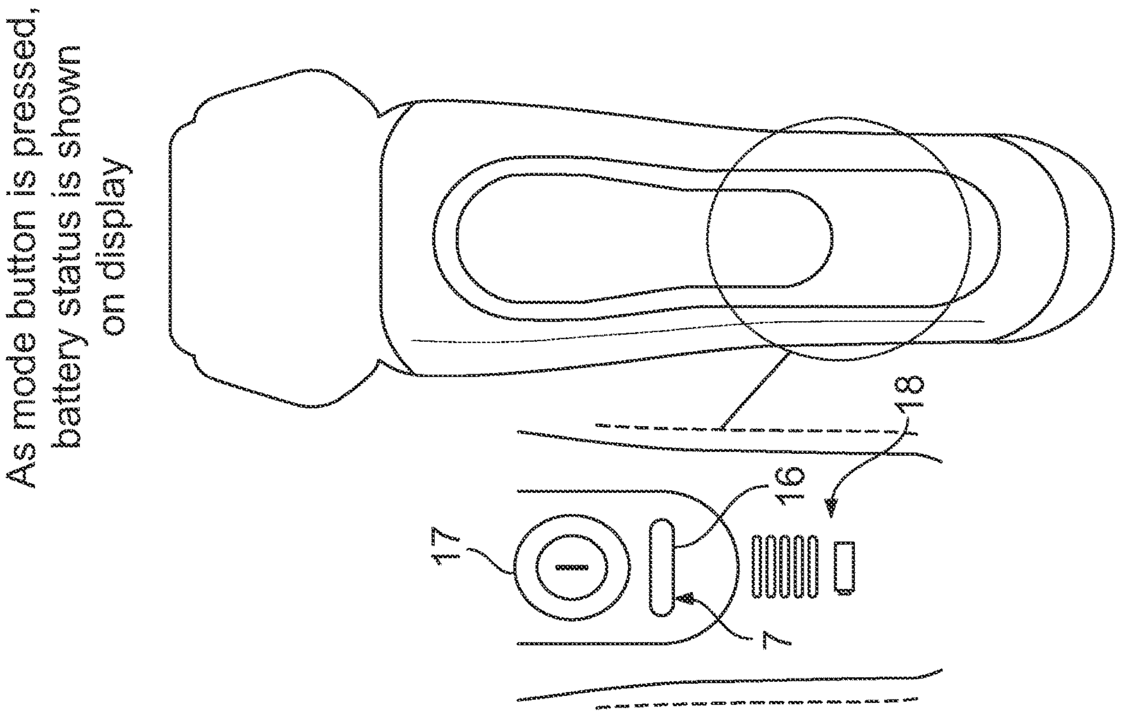
FIGS. 5A and 5B: schematic views of the shaver's display and the shaver's mode input element, wherein use of such mode input element is illustrated when the shaver is switched off, wherein different display modes of the display as selected by the mode input element are illustrated.
Figure 5A:
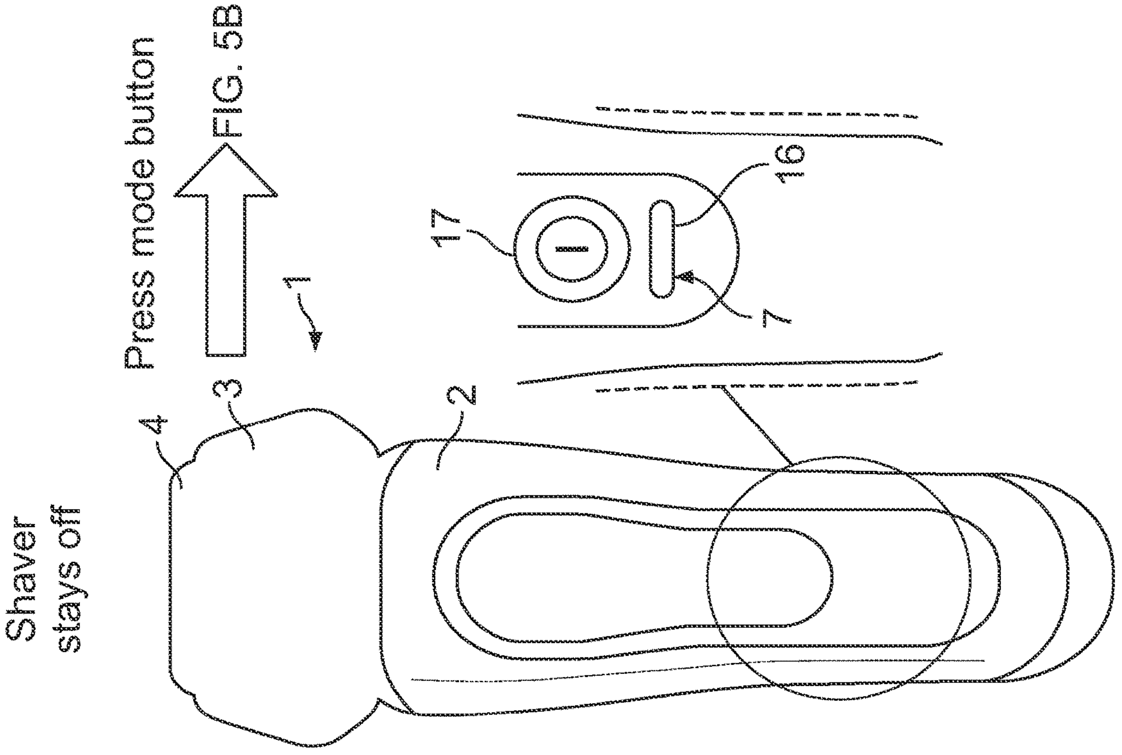

As can be seen from FIGS. 4A and 4B, due to such automatic switching mode, the display 18 may display, after having displayed the charging level, the cleaning status, cf. FIG. 4A and thereafter, the cutter unit's status, cf. FIG. 4B. Such automatic switching of the display modes may be effected under time control of a timer 9.

As can be seen from FIGS. 3A, 3B, 4A, 4B, the display 18 may indicate in its second display field 18*b* the type of information displayed, wherein a respective information type symbol such as a battery, cleaning fluid drops or a foil cassette symbol or other pictograms may be shown.

As can be seen from FIGS. 5A, 5B, 6A, 6B, the display modes of display device 6 also can be switched manually by means of using the aforementioned mode input element 7 which, in its genuine function may be used to switch the operation modes of the active shaver such as cutting speed, oscillation frequency etcetera. When the shaver is sleeping and/or has been switched off, the display also may go into a sleeping mode, cf. FIG. 5A. When activating or touching the mode input element 7, the display is wakening up and first may show the battery charging level, cf. FIG. 5B.

Figure 6B:
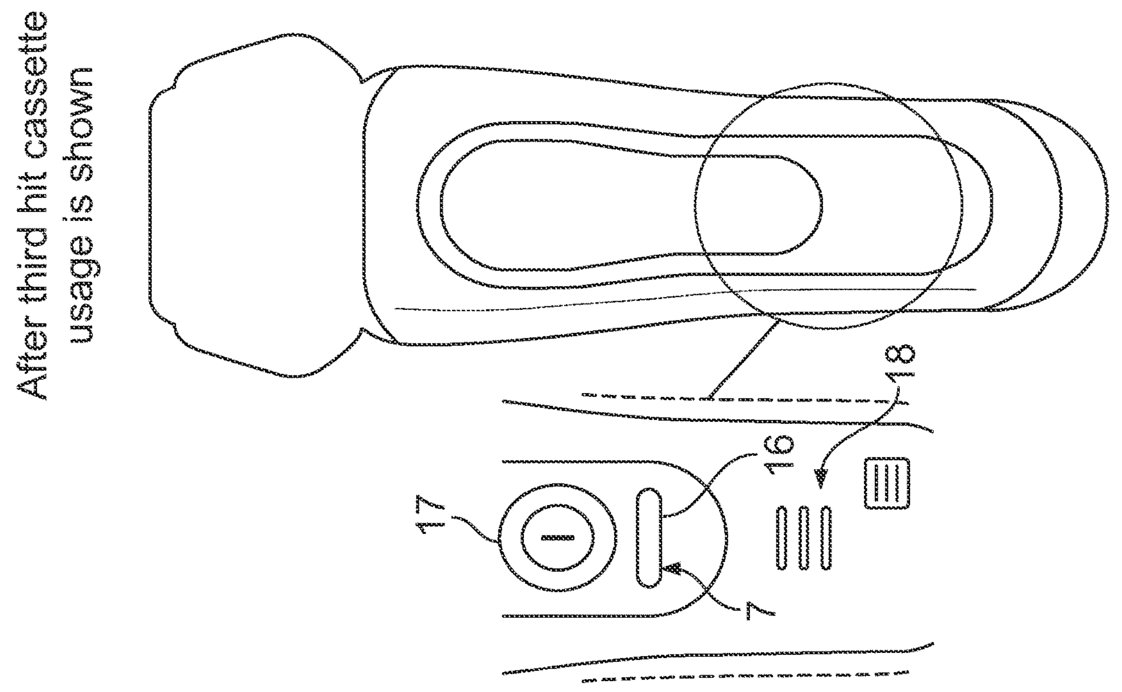
FIGS. 6A and 6B: schematic views of the shaver's display in further different display modes as selected by the mode input element when the shaver's drive unit is inactive.
Figure 6A:
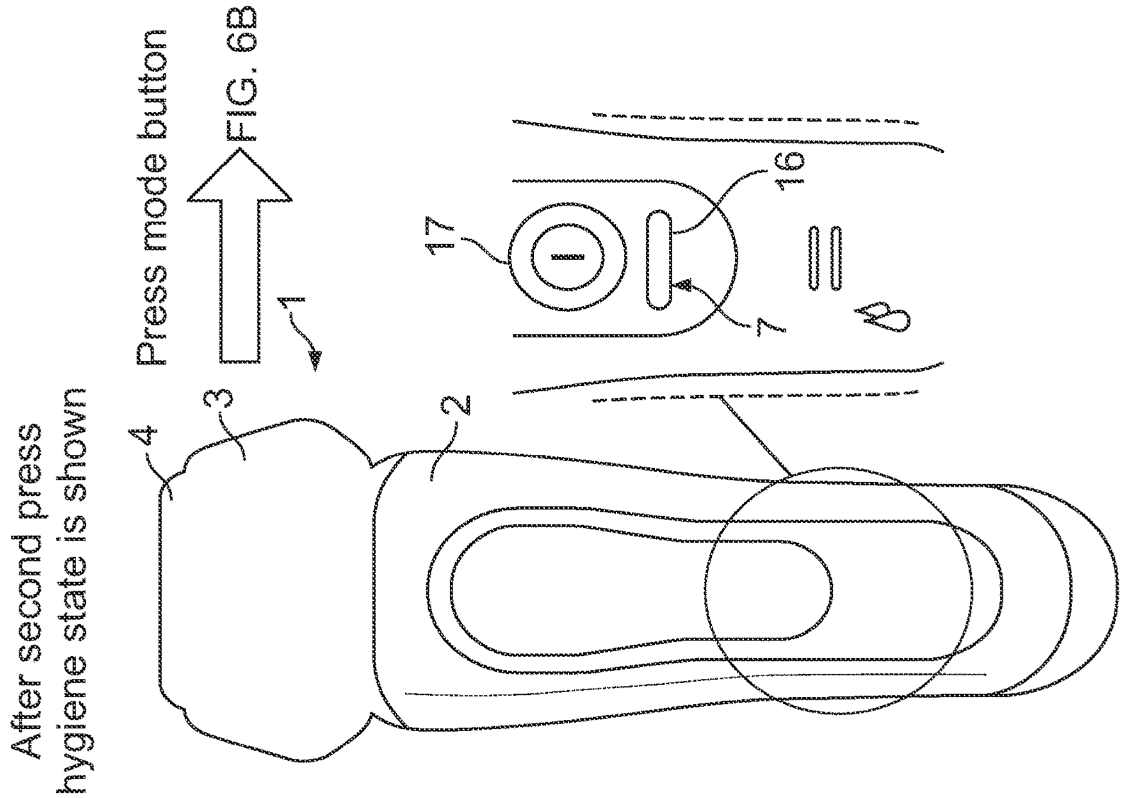

By means of touching or activating the mode input element 7 once again or further times, the display device 6 is caused to switch into other display modes to display other sets of information such as the cleaning status, cf. FIG. 6A and the cutter unit status, cf. FIG. 6B.

As can be seen from FIGS. 3A and 3B, the shaver 1 further may be provided with a dirt measurement unit 20 for measuring parameters relevant to the dirt status, wherein such measurement unit 20 may include a voltage and/or current detector for detecting power consumption of the drive unit during shaving and/or a time measurement means for measuring shaving time, for example.

A micro controller 21 may receive signals indicative of such parameters and may analyze such signals to determine the dirt status, wherein indicating means 22 such as the described display device 6 may be controlled by the micro controller 21 to indicate to a user the dirt status. In addition or in the alternative, such dirt status information may be communicated to a charging and/or cleaning station to automatically initiate a cleaning cycle in response to the dirt status.

The dimensions and values disclosed herein are not to be understood as being strictly limited to the exact numerical values recited. Instead, unless otherwise specified, each such dimension is intended to mean both the recited value and a functionally equivalent range surrounding that value. For example, a dimension disclosed as "40 mm" is intended to mean "about 40 mm."

Every document cited herein, including any cross referenced or related patent or application and any patent application or patent to which this application claims priority or benefit thereof, is hereby incorporated herein by reference in its entirety unless expressly excluded or otherwise limited. The citation of any document is not an admission that it is prior art with respect to any invention disclosed or claimed herein or that it alone, or in any combination with any other reference or references, teaches, suggests or discloses any such invention. Further, to the extent that any meaning or definition of a term in this document conflicts with any meaning or definition of the same term in a document incorporated by reference, the meaning or definition assigned to that term in this document shall govern.

While particular embodiments of the present invention have been illustrated and described, it would be obvious to those skilled in the art that various other changes and modifications can be made without departing from the spirit and scope of the invention. It is therefore intended to cover in the appended claims all such changes and modifications that are within the scope of this invention.

What is claimed is:

1. An electric shaver, comprising:

at least one cutter unit;

a drive unit having an active state and an inactive state, the active state having a plurality of different operation modes;

a display device operable in any of a plurality of different display modes, each different display mode corresponding to a displaying of a different set of shaver information;

a mode input element manually operable by a user to generate mode input signals;

a controller that receives the mode input signals from the mode input element and controls the drive unit and display device in response to the mode input signals;

wherein:

when the drive unit is in the active state:

the drive unit is controlled by the controller to drive said at least one cutter unit in a current operation mode selected from the plurality of the different operation modes;

the mode input element is manually operable to generate a corresponding mode input signal causing the controller to switch the current operation mode to another operation mode selected from the plurality of the different operation modes; and when the drive unit is in the inactive state:

the mode input element is manually operable to generate a corresponding mode input signal causing the controller to change a current display mode of the display device to another display mode selected from the plurality of different display modes;

the mode input element is manually operable to generate a corresponding mode input signal that causes the controller to activate an automatic switching mode of the display device; and when the automatic switching mode is activated, the display device is caused by the processor to sequentially display one set of shaver information for a period of time under control of a timer then after the period of time displays another different set of shaver information.

2. The electric shaver according to claim 1, wherein an activator is provided for activating said automatic switching mode, wherein said activator is responsive to a switching off-signal indicating switching off the drive unit and indicating transition of the drive unit from being active to being inactive, and responsive to a switching on-signal indicating switching on the drive unit and indicating transition of the drive unit from being inactive to being active.

3. The electric shaver according to claim 1, wherein a detector is provided for detecting objects or subjects touching and approximating the shaver, wherein an activator is provided for activating said automatic switching mode, wherein said activator is configured to be responsive, when said shaver is sleeping, to a touching/approximation signal of said detector to activate the automatic switching mode when an object or subject is touching and approximating the shaver.

4. The electric shaver according to claim 1, wherein said mode input element is configured to switch the operation mode of the drive unit, and/or to select the display mode of the display device, and/or to activate the automatic switching mode of the display device, in response to a signal received from at least one of the following: an external control device, a smartphone, a shaver charging and/or cleaning station, a power ON/OFF button, a wake up sensing unit for detecting a waking up situation, or the timer.

5. The electric shaver according to claim 1, wherein said operation modes of the drive units include at least one of the following:

a low speed mode in which said cutter unit is driven at a low speed, a high speed mode in which said cutter unit is driven at a high speed, a long-hair cutting mode in which a long-hair cutter is driven by said drive unit, a short-hair shaving mode in which a short-hair cutter is driven by said drive unit, a brush attachment mode in which a skin treatment unit attachable to the electric shaver is driven by said drive unit, or a beard trimmer attachment mode in which a beard trimmer unit is driven by said drive unit.

6. The electric shaver according to claim 1, wherein said different display modes include at least one of the following:

a charge information mode in which the charging status of an accumulator is displayed, a shaving time information mode in which the shaving time measured since a last cleaning cycle is displayed, a cleaning information mode in which a cleaning status of the shaver is displayed, or a cutter unit wear information mode in which wear of the cutter unit is displayed.

7. The electric shaver according to claim 1, wherein said display device is under control of an electronic controller which is connected to at least one detector for providing at least one detector signal indicative of an information to be displayed, wherein said controller is responsive to a signal from said mode input element to display said information on the basis of the received detector signal indicative of said information when said mode input element has been activated to request displaying of said information.

8. The electric shaver according to claim 1, wherein said mode input element includes:

a toggle switch button for toggling from one operation mode to another operation mode of the drive unit and toggling from one displaying mode to another displaying mode of said display device, and a touch screen input element and a gesture detector for detecting a finger gesture.

9. The electric shaver according to claim 1, wherein said display device includes a first display field indicative of a value and an amount of an information, and a second display field indicative of the type of information, wherein said display device is configured to activate and operate said first display field in combination with different types of information displayed by said second information field.

10. The electric shaver according to claim 1, wherein said display device includes a display arranged at a handle of the shaver and is configured to control and communicate with an external display separate from said handle.

11. The electric shaver according to claim 1, wherein said at least one cutter unit includes an undercutter and an uppercutter moveable relative to each other in order to cut hair between said undercutter and uppercutter, wherein said cutter unit forms a part of a shaver head having an interior space in which said cut hair or other debris or dirt is accumulated, wherein a dirt measurement unit is provided for measuring a parameter that is related to the accumulated dirt, wherein a micro controller is configured to receive a signal from said dirt measurement unit and to calculate a dirt status of the shaver head in response to said received signal, wherein an indicating means is provided for indicating information relating to the dirt status of the shaver head to a user.

12. The electric shaver according to claim 11, wherein said dirt measurement unit is configured to measure at least one of the following parameters: shaving time, shaving resistance, shaving power consumption of the drive unit during shaving time, cleaning time, cleaning liquid or moisture inside the shaver head, and wherein the indicating means includes at least one of the following: the display device, a sound generator, a signal generator for generating a communication signal to be communicated to an external electronic device.

13. A method for controlling an electric shaver and a display device connected thereto, said electric shaver comprising:

at least one cutter unit;

a drive unit operable to drive said at least one cutter unit, wherein said drive unit, when active, is operable in more than one operation mode; and a mode input element operable to generate mode input signals to switch the drive unit into different operation modes, and to switch the display device into different display modes; and a controller that receives the mode input signals from the mode input element and controls the drive unit or the display device in response to the mode input signals, the method comprising:

manually activating the mode input element to switch the operation mode of the drive unit when said drive unit is active; and manually activating an automatic switching mode of the display, either by activating the mode input element or by switching the electric shaver off, wherein the automatic switching mode of the display, when activated, comprises an automatic switching of the display device into different display modes by a timer to display a plurality of the different sets of the shaver information one after the other.

14. The electric shaver according to claim 1, wherein the different sets of information include at least one of the following:

a cleaning status of the shaver, or a wear of the cutter unit.

15. The method of claim 13, wherein the plurality of sets of shaver information include at least one of:

a cleaning status of the shaver, or a wear of the cutter unit.

16. An electric shaver, comprising:

at least one cutter unit;

a drive unit operable to drive said at least one cutter unit in any of a plurality of different operation modes when the drive unit is active;

a display device operable to display different sets of shaver information;

a mode input element operable to generate mode input signals; and a controller that receives the mode input signals from the mode input element and controls the drive unit of the display device in response to the mode input signals, wherein:

said display device is configured to be operable in an automatic switching mode in which ones of the different sets of information are displayed one after the other under control of a timer when the electric shaver is switched off;

said mode input element comprises at least one push button configured to change a functionality of the mode input unit depending on an ON/OFF status of the drive unit; and when the ON/OFF status of the drive unit is OFF, the mode input element functions to cause the display device to display one set of the shaver information or to activate the automatic switching mode; and when the ON/OFF status of the drive unit is ON, the mode input element functions to change the operation mode of the drive unit.

17. The electric shaver according to claim 1, wherein:

when the drive unit is in the active state, the mode input element is manually operable to invoke a shifting function causing the controller to toggle from a first mode to a second mode or from the second mode to the first mode;

in the first mode, the mode input element is manually operable to generate a corresponding mode input signal causing the controller to switch the current operation mode to another operation mode selected from the plurality of the different operation modes; and in the second mode, the mode input element is manually operable to generate a corresponding mode input signal causing the controller to change a current display mode of the display device to another display mode selected from the plurality of different display modes.

* * * * *